United States Patent [19]

Beech

[11] 4,114,258

[45] Sep. 19, 1978

[54] METHOD OF MAKING A STATOR ASSEMBLY

[75] Inventor: Keith James William Beech, Walsall, England

[73] Assignee: Lucas Industries Limited, Birmingham, England

[21] Appl. No.: 798,347

[22] Filed: May 19, 1977

[30] Foreign Application Priority Data

May 28, 1976 [GB] United Kingdom .............. 22379/76

[51] Int. Cl.² ........................................... H02K 15/06
[52] U.S. Cl. .................................. 29/596; 29/522 R; 29/736
[58] Field of Search ................. 29/596, 598, 736, 732, 29/522; 310/42

[56] References Cited

U.S. PATENT DOCUMENTS

| 2,506,173 | 5/1950 | Polard | 29/736 |
| 3,818,585 | 6/1974 | Preece | 29/596 |
| 3,892,034 | 7/1975 | Arakelov | 29/596 |

Primary Examiner—Carl E. Hall
Attorney, Agent, or Firm—Holman & Stern

[57] ABSTRACT

A method of manufacturing a dynamo electric machine stator assembly of the kind which includes a hollow cylindrical yoke defining internally a plurality of poles, and a sinusoidal field winding extending around the poles. The method includes the steps of inserting a reduced diameter winding into the yoke with the axial portions of the winding aligned with the spaces between the adjacent pairs of poles. The winding is then expanded radially to engage the axial portions between the respective poles and finally the winding is secured in position by subjecting the winding to a compressive loading in an axial direction. Care is taken to ensure that the winding does not collapse radially inwardly and the magnitude of the axial loading applied to the winding is sufficient to cause initial elastic deformation of the winding into contact with the poles and the inner surface of the yoke, and then subsequently plastic deformation of the winding whereby upon release of the axial loading the winding remains in its deformed configuration.

3 Claims, 7 Drawing Figures

METHOD OF MAKING A STATOR ASSEMBLY

This invention relates to a method of manufacturing a dynamo electric machine stator assembly of the kind comprising a hollow cylindrical yoke having therein a plurality of angularly spaced axially extending, radially inwardly projecting poles, and a sinusoidal field winding engaging the poles, said winding including a plurality of axial portions each engaged between a respective pair of circumferentially adjacent poles, and a plurality of curved end portions, each curved end portion extending around an end of a respective pole and interconnecting an adjacent pair of axial portions, circumferentially adjacent curved end portions of the winding being disposed at opposite axial ends of the winding respectively.

According to the invention a method of manufacturing a stator assembly of the kind specified comprises the steps of axially inserting a reduced diameter sinusoidal field winding into the yoke with the axial portions of the winding aligned with the spaces between respective pairs of poles, expanding the winding radially to engage the axial portions of the winding between their respective pairs of poles, and, securing the expanding winding in position in the yoke by subjecting the winding to a compressive loading in an axial direction while holding the winding against radially inward collapse, the magnitude of the axial loading applied to the winding being sufficient to cause initial elastic deformation of the winding into contact with the poles and the inner surface of the yoke and subsequent plastic deformation of the winding, whereby, upon release of the axial loading the winding remains in its deformed configuration engaging the poles and the inner surface of the yoke and so gripping the poles and the yoke so as to retain itself in position in the yoke.

Preferably the sinusoidal field winding is initially formed with a diameter substantially equal to its final diameter, the winding then being collapsed radially inwardly to a reduced diameter such that the reduced diameter field winding can be introduced axially into the yoke.

Conveniently, the step of expanding the winding within the yoke is performed by introducing a mandrel into the winding, the mandrel including a tapering region, which, during insertion of the mandrel through the winding, expands the winding, the mandrel being left in position during the application of axial loading to the winding, so that the mandrel serves to hold the winding against radially inward collapse.

The apparatus for performing the method set out above, comprising mandrel means for insertion into the assembly to resist inward radial collapse of the winding and compression means for applying an axial compressive loading to the winding to cause deformation thereof.

One example of the invention will now be described with reference to the accompanying drawings wherein.

Figure 3:
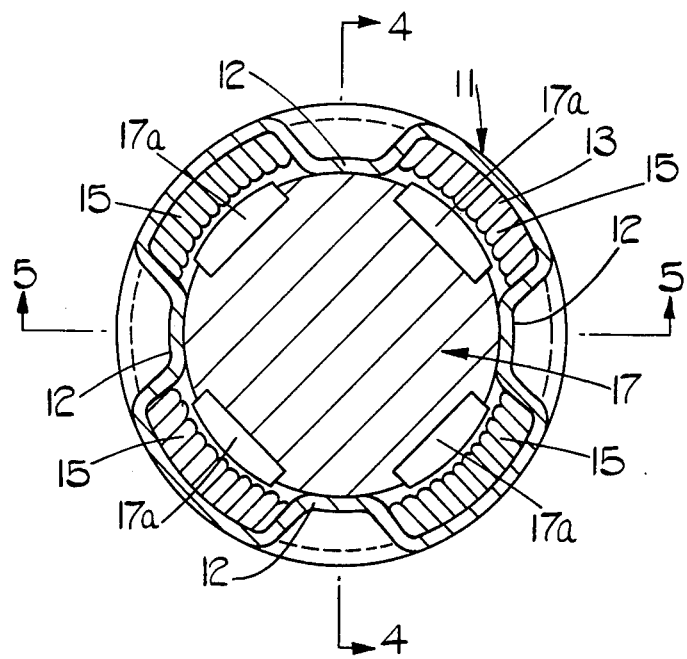
FIG. 3 is a transverse sectional view of the stator assembly at one stage during its manufacture.
Figure 4:
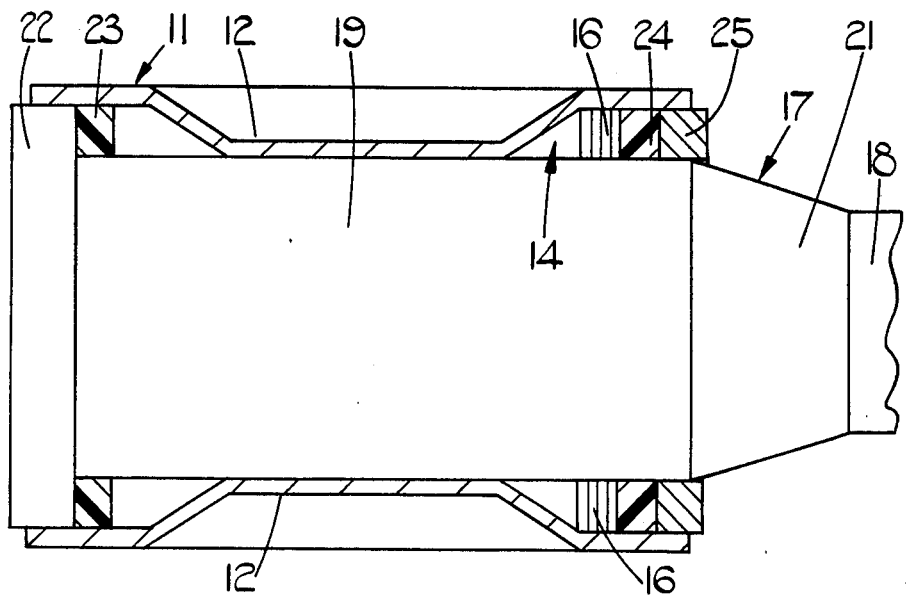
Figure 5:
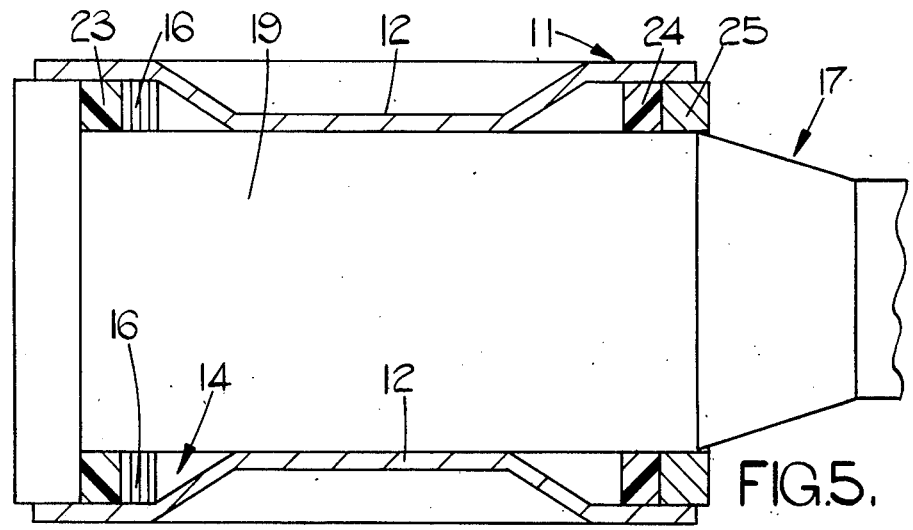
Figure 6:
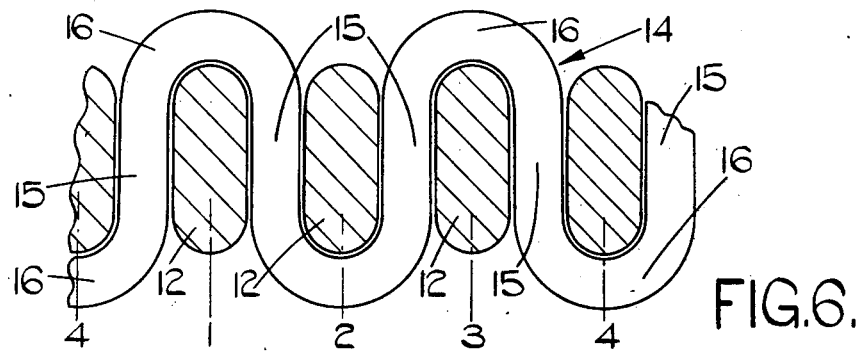
Figure 7:
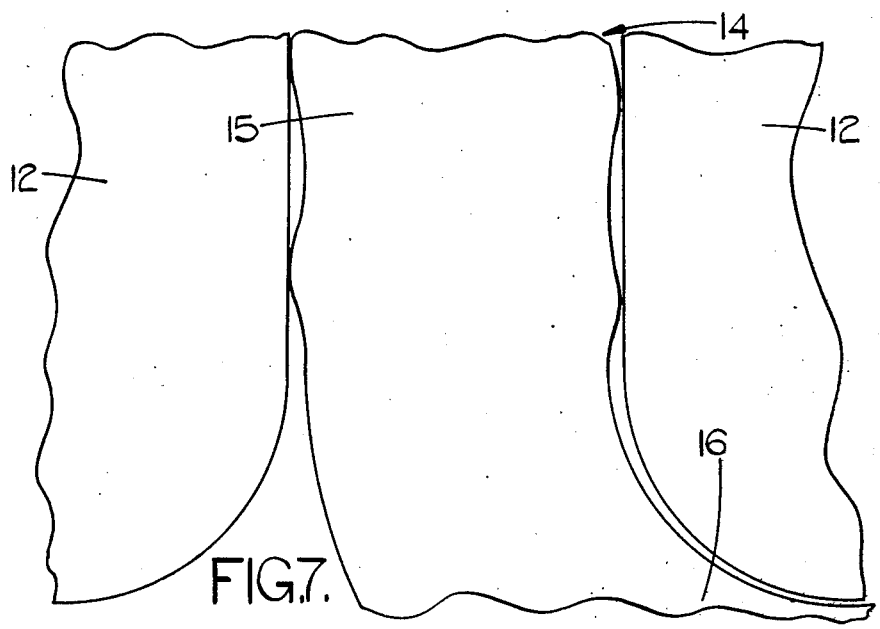

FIGS. 4 and 5 are sectional views on the lines 4—4 and 5—5 in FIG. 3 respectively;

FIG. 6 is a developed view of the interior of the yoke assembly shown in FIG. 3; and FIG. 7 is an enlargement of part of FIG. 6, but showing the components at a later stage in the manufacture.

Figure 1:
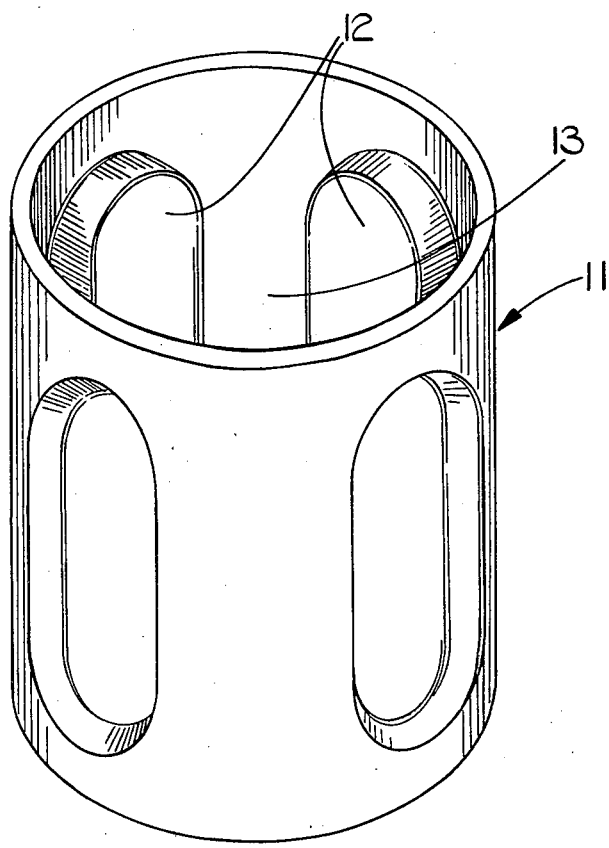
FIG. 1 is a perspective view of a yoke for a stator assembly.
Figure 2:
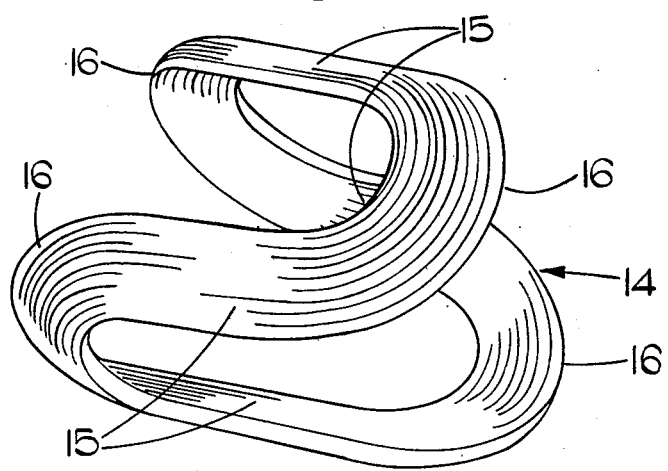
FIG. 2 is a perspective view of a sinusoidal field winding.

Referring to the drawings, it is desired to manufacture a stator assembly for a dynamo electric machine of the kind including a mild steel yoke 11 which is in the form of a hollow, mild steel, cylinder carrying four equi-angularly spaced poles 12 on its inner surface. The four poles 12 are defined by indented regions of the hollow mild steel cylinder and thus each of the poles 12 projects radially inwardly of the yoke 11. Each of the poles 12 extends axially and has rounded ends. It will be appreciated that four axially extending gaps are defined between the side walls of the poles each gap 13 being defined between circumferentially adjacent poles 12. The field winding 14 of the stator assembly is as shown in FIG. 2, a sinusoidal field winding. The field winding 14 is formed from a single length of aluminium strip which is bent to produce ultimately a plurality of parallel sinusoidal convolutions. Adjacent convolutions are electrically insulated from one another in any convenient manner, for example by forming the windings from strip previously provided with an insulating coating. In this instance, since the yoke has four poles then the winding has four axial portions 15, each axial portion 15 in use occupying a respective gap 13 between adjacent poles. The axial portions 15 are inter-connected by integral curved end portions 16, each curved end portion 16 inter-connecting a circumferentially adjacent pair of axial portions 15, and in use extending around the curved end of a respective pole 12. Moreover, circumferentially adjacent curved end portions 16 are disposed at opposite axial ends respectively of the winding.

In the finished stator assembly the winding 14 is engaged in the yoke 11 with the axial portions 15 in the gaps 13 and engaging the inner surface of the yoke 11 and the end portions 16 extending around respective ends of the poles 12.

The yoke is pre-formed and is of a solid construction. Similarly the winding 14 is formed externally of the yoke rather than being wound into the yoke. In order to assemble the winding of the yoke, the winding is initially formed with a diameter and axial length substantially equal to that required of the winding when in position in the yoke. Thereafter the winding is passed through a reducing die which is a tubular die having a tapering bore. In forcing the winding through the tapering bore of the reducing die the winding is radially collapsed so that the resultant winding has a reduced diameter. The reduction in diameter is such that the external diameter of the winding is substantially equal to the minimum internal diameter of the yoke, that is to say the diameter bounded by the innermost faces of the poles 12. The reduction in diameter entails an increase in axial length.

The reduced diameter winding is then introduced into the yoke 11 and is angularly orientated such that the axial portions 15 of the winding are radially aligned with their respective gaps 13. Thereafter, a mandrel 17 is employed to expand the winding within the yoke.

The mandrel 17 comprises a lead region 18, which is of a diameter substantially equal to the internal diameter of the reduced diameter winding, and a main portion 19 of a diameter substantially equal to the internal diameter of the winding in its finished condition. Intermediate the regions 18 and 19 and mandrel 17 includes a tapering region 21. It will be understood therefore that when the mandrel 17 is introduced into the winding and is pushed therethrough the region 21 of the mandrel causes the winding to be expanded radially outwardly so that the portions 18 thereof enter the gaps 13 and the end regions 16 lie around their respective pole ends.

If the mandrel is removed at this point then some radial restoration of the winding towards its reduced diameter condition will occur, and the winding will be a loose fit in the yoke.

In order to secure the winding in the correct position within the yoke, without the necessity of employing adhesives or additional mechanical fixing devices, the winding is subject to an axial loading of a predetermined magnitude. The axial loading is applied with the mandrel 17 in position that is to say with the portion 19 of the mandrel within the winding. At the free end of the region 19 of the mandrel, the mandrel is formed with a circumferential flange 22 of a diameter equal to the maximum of internal diameter of the yoke 11. Encircling the region 19 of the mandrel and abutting the flange 22 is a ring 23 of rectangular cross section, the ring 23 being formed from synthetic resin material conveniently Avothene. The face of the ring 23 remote from the flange 22 engages the two curved end portions of the winding 14 which are disposed at that particular end of the yoke. At the opposite end of the yoke there is provided a second moulded synthetic resin ring 24 substantially identical to the ring 23 and slidably encircling the region 19 of the mandrel 17. Abutting the ring 24 is a similar ring 25 formed from steel. It will be understood that the ring 24 abuts the two curved end portions 16 at that end of the yoke, and thus the points of abutment between the ring 23 and the winding are spaced around the axis of the assembly by 90° from the points of abutment between the ring 24 and the winding. The mandrel is held against movement and a compressive loading is applied in an axial direction to the ring 25 to move the ring 25 towards the flange 22. Thus this compressive loading is applied to the winding 14 by way of the rings 23, 24. The magnitude of the axial loading is so chosen as to initially cause elastic deformation of the winding 14, so that the winding 14 bows radially outwardly to engage the inner surface of the yoke between the poles, and also to cause buckling of the axial portions 15 of the winding within the gaps 13. At this point it should be stressed that the clearance between the portions 15 and the side walls of the poles defining the gaps 13 is relatively small, and so the degree of buckling is similarly small. The buckling can be seen in FIG. 7 where it is shown in an exaggerated manner for the sake of clarity.

It will be understood that if the axial loading was sufficient only to achieve elastic deformation then upon release of the loading the resilience of the material of the winding 14 would cause the winding 14 to restore to its original configuration. Thus the magnitude of the axial loading is such that following the initial elastic deformation plastic deformation of the winding occurs so that upon release of the loading the winding remains in its deformed configuration. It will be understood that since the loading is applied to winding at the end regions 16, in addition the end regions 16 are deformed against their respective curved ends of the poles. Thus upon release of the compressive force, the winding remains in its deformed configuration bearing against the ends and the sides of the poles 12, and bearing in a radial direction against the inner surface of the yoke.

Thus the winding is locked in position within the yoke against movement relative thereto without the aid of adhesives, or any additional mechanical devices.

During the application of axial loading the presence of the mandrel 17 within the yoke prevents radially inward collapse of the winding which might otherwise occur. The movement of the winding is thus constrained to circumferential buckling and radially outward expansion.

As can be seen in FIG. 3 the mandrel can, if desired, be provided with axially extending equi-angularly spaced pads 17a which are positioned close to the winding portions 15. Furthermore the Avothene rings 23, 24 can be provided with diametrically opposed pairs of raised pads for engaging the end portions 16 of the winding. In the event that the rings 23, 24 are provided with such pads, then it will be understood that the rings must be correctly angularly orientated with respect to one another and the winding before the loading is applied. It will be appreciated that the introduction of the mandrel into the winding to expand the winding can be followed in the same operation by the application of compressive loading provided that the rings 23, 24, 25 are in position and the mandrel is introduced through the winding. In other words, both the expansion and the deformation of the winding can be achieved in different parts of the single continuous movement of the mandrel, the ring 25 being locked against movement and so acting as a fixed abutment relative to which the mandrel and the yoke assembly move to apply the axial loading.

While the method of manufacture set out in the above example relates to a four-pole construction it will be understood that constructions having alternative numbers of poles can be manufactured in a similar manner. The magnitude of the compressive loading applied to the winding to cause initial elastic deformation and then subsequent plastic deformation will depend upon the nature of the winding and the material from which the winding is formed. However, the loading is readily determined by trial and error, and of course where the assemblies are being mass-produced then provided the winding form and material is constant then the loading determined by trial and error for the first assembly will suffice for the remainders.

I claim:

1. A method of manufacturing a dynamo electric machine stator assembly wherein the stator assembly comprises a hollow cylindrical yoke having therein a plurality of angularly spaced axially extending radially inwardly projecting poles, and a sinusoidal field winding engaging the poles, the winding including a plurality of axially portions each engaged between a respective pair of circumferentially adjacent poles, and a plurality of curved end portions each curved end portion extending around an end of a respective pole and interconnecting an adjacent pair of axial portions, circumferentially adjacent curved end portions of the winding being disposed at opposite axial ends of the winding respectively, the method comprising the steps of axially inserting a reduced diameter sinusoidal field winding into the yoke with the axial portions of the winding aligned with the spaces between respective pairs of poles, expanding the winding radially to engage the axial portions of the winding between their respective pairs of poles, and, securing the expanded wiring in position in the yoke by subjecting the winding to a compressive loading in an axial direction while holding the winding against radially inward collapse, the magnitude of the axial loading applied to the winding being sufficient to cause initial elastic deformation of the winding into contact with the poles and the inner surface of the yoke and subsequent plastic deformation of the winding whereby upon release of axial loading the winding remains in its deformed configuration engaging the poles and the inner surface of the yoke and so gripping the poles and the yoke so as to retain itself in position in the yoke.

2. A method as claimed in claim 1 wherein the sinusoidal field winding is initially formed with a diameter substantially equal to its final diameter, the winding then being collapsed radially inwardly to a reduced diameter such that the reduced diameter winding can be introduced axially into the yoke.

3. A method as claimed in claim 1 wherein the step of expanding the winding within the yoke is performed by introducing a mandrel into the winding, the mandrel including a tapering region which, during insertion of the mandrel through the winding, expands the winding, the mandrel being left in position during the application of axial loading to the winding so that the mandrel serves to hold the winding against radially inward collapse.

* * * * *